(12) United States Patent
Feinberg

(10) Patent No.: US 6,916,059 B2
(45) Date of Patent: Jul. 12, 2005

(54) GOLF CART ENCLOSURE ASSEMBLY (75) Inventor: David Feinberg, Seattle, WA (US)

(73) Assignee: Classic Accessories, Inc., Kent, WA (US)

( * ) Notice: Subject to any disclaimer, the term of this patent is extended or adjusted under 35 U.S.C. 154(b) by 0 days.

(21) Appl. No.: 10/748,984

(22) Filed: Dec. 30, 2003

(65) Prior Publication Data
US 2004/0239140 A1 Dec. 2, 2004

Related U.S. Application Data
(60) Provisional application No. 60/437,234, filed on Dec. 31, 2002.

(51) Int. Cl.$^7$ ................................................ B60J 9/00
(52) U.S. Cl. ............................ 296/79; 296/83; 296/145
(58) Field of Search .......................... 296/77.1, 79, 80, 296/83, 96.2, 145, 78.1

(56) References Cited

U.S. PATENT DOCUMENTS

| | | | | |
|---|---|---|---|---|
| 726,906 A | * | 5/1903 | Gordon ........................ | 296/83 |
| 2,789,863 A | * | 4/1957 | Shimabukuro ............. | 296/77.1 |
| 3,834,756 A | * | 9/1974 | Grell ........................ | 296/77.1 |
| 4,013,315 A | * | 3/1977 | West ........................... | 296/83 |
| 4,098,536 A | * | 7/1978 | Mills ......................... | 296/77.1 |
| 4,773,694 A | * | 9/1988 | Gerber ...................... | 296/77.1 |
| 5,217,275 A | * | 6/1993 | Ridge ....................... | 296/77.1 |
| 5,388,881 A | * | 2/1995 | Spencer et al. ............ | 296/77.1 |
| 6,439,637 B1 | * | 8/2002 | Tyrer ......................... | 296/79 |
| 6,497,444 B1 | * | 12/2002 | Simon ...................... | 296/77.1 |
| 6,761,391 B2 | * | 7/2004 | Winkler ..................... | 296/79 |
| 2004/0007894 A1 | * | 1/2004 | Hamm ...................... | 296/79 |

* cited by examiner

Primary Examiner—Lon L. Coletta
(74) Attorney, Agent, or Firm—Perkins Coie LLP

(57) ABSTRACT

A three-sided enclosure assembly usable with a golf cart having upright members supporting a roof. The enclosure assembly has first and second side panels positionable adjacent to side portions of the golf cart and adjacent to the roof. A rear panel is between the first and second side panels and is positionable adjacent to a rear portion of the golf cart. A support strap is connected to the top portions of the first and second side panels and is configured to removably attach the first and second side portions to the two upright members of the golf cart adjacent to the roof portion. The support strap supports the first and second side panels adjacent to side portions of the golf cart and the rear panel adjacent to a rear portion of the golf cart.

20 Claims, 5 Drawing Sheets

GOLF CART ENCLOSURE ASSEMBLY

CROSS-REFERENCE TO RELATED APPLICATION(S)

The present application is a nonprovisional patent application that claims priority to U.S. Provisional Patent Application No. 60/437,234 entitled "Golf Cart Covers," filed Dec. 31, 2002, which is hereby incorporated in its entirety by reference thereto.

TECHNICAL FIELD

The present disclosure relates generally to enclosures for golf carts and other vehicles.

BACKGROUND

Conventional powered golf carts are typically open-sided vehicles having a body and a hard-top roof supported by four support posts mounted to the body. The open sides make it easy for people to get in and out of the cart. The open-sided carts, however, do not provide much protection for occupants against wind, rain, insects, or other adverse conditions. Covers that fit over golf carts have been designed to more fully enclose the carts and better protect occupants from such adverse conditions.

Conventional soft-sided golf cart covers typically have a roof panel that extends over the roof of the cart, and side panels that drape down over the sides of the cart's body and hang in tension from the roof panel. Some covers are four-sided covers designed for use with carts that do not have a permanent windshield. These covers typically include a front panel that hangs in tension from the roof panel and drapes over the front of the golf cart. The roof panels, however, cover rain gutters and handholds molded into the cart's roof, thereby rendering the rain gutters and handholds substantially useless. In addition, the roof panel is typically the first portion of the cover to wear out over time because the roof panel has the greatest amount of UV exposure.

One problem encountered by conventional covers is that golf carts are available in many different models and are manufactured by a variety of companies. Golf carts do not all have uniform shapes and sizes. As a result, different cart covers are designed and sized to fit over different golf cart models, thereby resulting in cover manufacturers, wholesalers, or retailers having to stock multiple different models of golf cart covers. Accordingly, there is a need for a durable, affordable golf cart cover suitable for mass production and tailored for use with a majority of golf carts of the same class (e.g., single seat, two-person golf cart) commercially produced by the largest manufacturers.

DETAILED DESCRIPTION

The following disclosure describes embodiments of cover assemblies for powered golf carts and methods of using the cover assemblies in accordance with the present invention. Many specific details of the invention are described below with reference to a golf cart, but embodiments can be used with other open-sided carts, cars, or other vehicles. Embodiments in accordance with the invention are set forth in FIGS. 1–9 and in the following text to provide a thorough understanding of particular embodiments of the invention. A person skilled in the art will understand, however, that the invention may have additional embodiments, or that the invention may be practiced without several of the details of the embodiments shown in FIGS. 1–9.

One aspect of the invention is directed to a three-sided enclosure assembly usable with a golf cart having upright members supporting a roof. The enclosure assembly has first and second side panels positionable adjacent to side portions of the golf cart and adjacent to the roof. A rear panel is between the first and second side panels and is positionable adjacent to a rear portion of the golf cart. A support strap is connected to the top portions of the first and second side panels and is configured to removably attach the first and second side portions to the two upright members of the golf cart adjacent to the roof portion. The support strap supports the first and second side panels adjacent to side portions of the golf cart and the rear panel adjacent to a rear portion of the golf cart.

Figure 1:
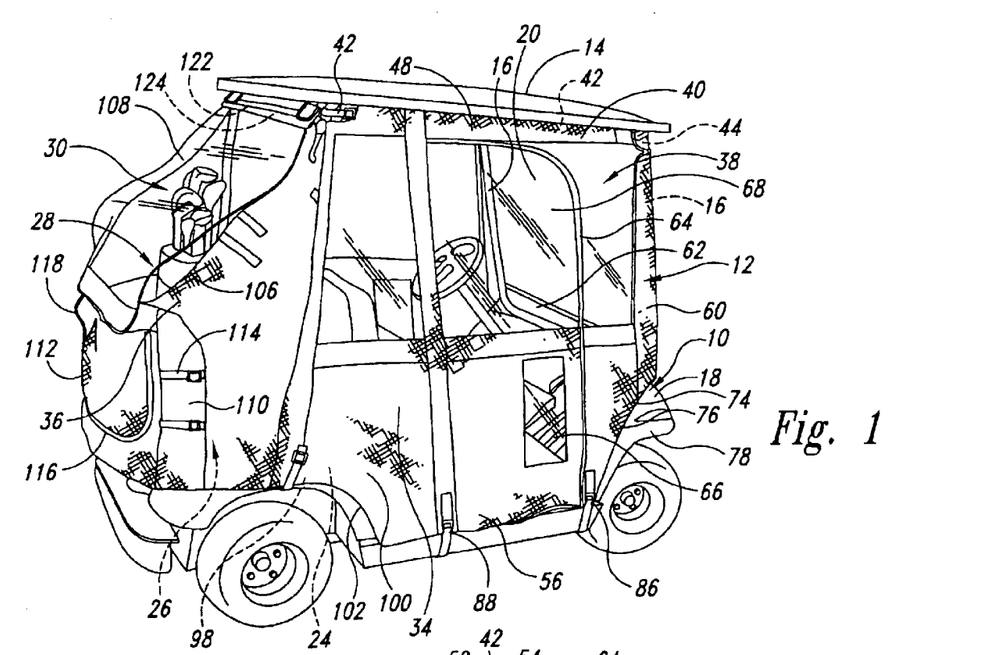
FIG. 1 is a rear isometric view of a golf cart and enclosure assembly in accordance with one embodiment of the present invention.
Figure 2:
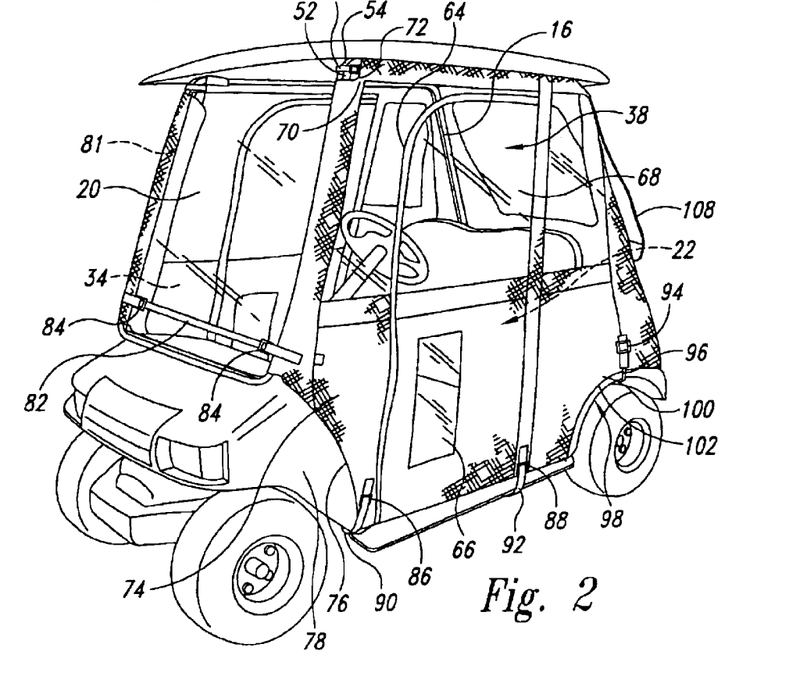
FIG. 2 is a front isometric view of the golf cart and enclosure assembly of FIG. 1.

FIG. 1 is a rear isometric view of a golf cart 10 with an enclosure assembly 12 in accordance with one embodiment of the present invention. FIG. 2 is a front isometric view of the golf cart 10 and enclosure assembly 12 of FIG. 1. The golf cart 10 is a conventionally powered, open-sided golf cart having a molded roof 14 supported on four support posts 16 that attach to a body 18. A windshield 20 is supported between the two forward support posts 16 to provide a windbreak for the occupants while riding in the golf cart 10. A person can get into or out of the golf cart 10 through either the cart's open left side 22 (FIG. 2) or right side 24 (FIG. 1). The rear end portion 26 of the golf cart 10 has a storage area 28 configured to carry, for example, golf bags and golf clubs 30.

The enclosure assembly 12 is a three-sided enclosure removably installed on the golf cart 10 to provide an enclosure around the left side 22, the right side 24, and the rear end 26, including the storage area 28. The illustrated golf cart 10, however, is only one of many models of golf carts made by one manufacturer. The enclosure assembly 12 of the illustrated embodiment is adapted to fit on a wide variety of other generally similar golf cart models having different shapes and sizes. Accordingly, the enclosure assembly 12 provides a one-size-fits-all-type enclosure that can be installed on any one of a plurality of different golf carts made by different golf cart manufacturers, such as Club Car, EZ-Go, or Yamaha.

The three-sided enclosure assembly 12 of the illustrated embodiment has a left side panel 32 positioned to enclose the left side 22 of the golf cart 10, a right side panel 34 that encloses the right side 24 of the golf cart, and a rear side panel 36 that extends around and partially covers the rear end portion 26 of the golf cart. The enclosure assembly 12 of the illustrated embodiment is made of flexible and durable materials, such as a heavy canvas-like cloth material. The enclosure assembly 12 also includes windows 38 made of a heavy-duty, transparent plastic material that allows for visibility through the left, right, and rear side panels 32, 34, 36 when the enclosure assembly is installed on the golf cart 10.

Figure 3:
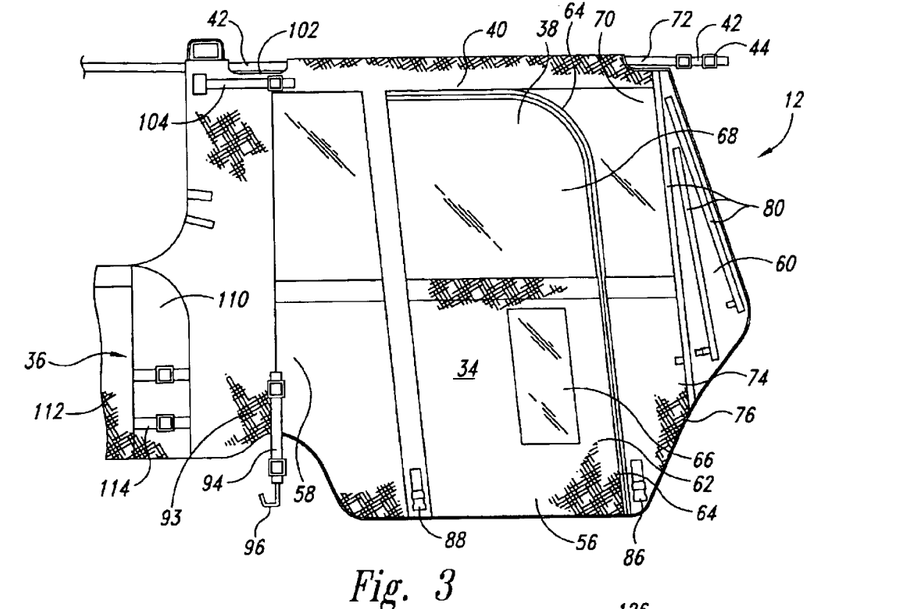
FIG. 3 is an enlarged, partial plan view of a side panel and a portion of a rear panel of the enclosure assembly shown removed from the golf cart of FIG. 1.

The enclosure assembly 12 is releasably attached to the golf cart at a number of locations, including along top edge portions 40 of the left, right, and rear side panels 32, 34, 36. As best seen in FIGS. 1–3, the enclosure assembly 12 includes an upper connection strap 42 attached to the top edge portions 40 of the side panels 32, 34, 36. The top edge portions 40 and the upper strap 42 are configured to form an adjustable waist that can be cinched onto the golf cart 10 just below the roof 14, as discussed in greater detail below. The upper strap 42 releasably connects to the forward support posts 16 by a pair of buckles 44 on the ends of the upper strap 42. In the illustrated embodiment, the buckles 44 are side-release buckles positioned so the end portions of the upper strap 42 can wrap around upper portions 52 of the forward support posts 16 and connect onto itself at the buckle 44. The upper strap 42 extends rearwardly from the buckles 44 through channels 48 formed in the top edge portions 40 of the left and right side panels 32 and 34. In alternate embodiments other connection devices can be used to connect the ends of the upper straps 42 to the two forward support posts 16 or to another suitable anchoring structure.

Figure 5:
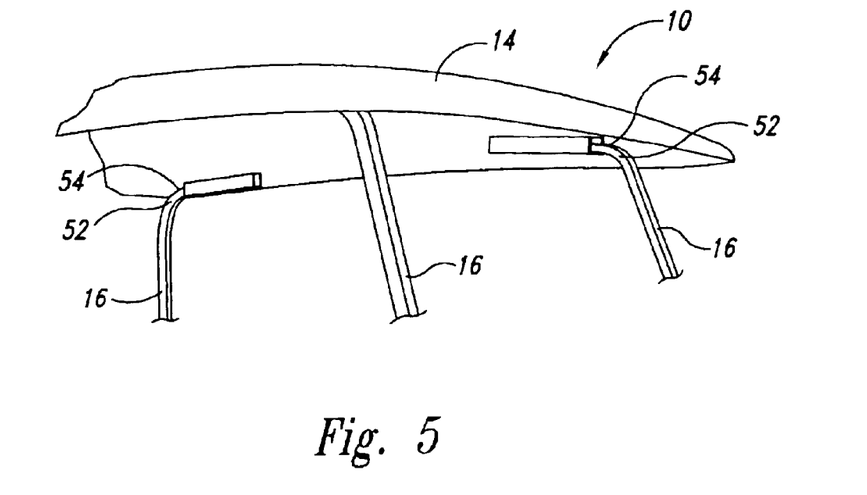
FIG. 5 is an enlarged, partial isometric view of curved upper end support posts and a molded roof of the golf cart of FIG. 1 with the enclosure assembly removed.

As best seen in FIG. 5, the upper portions 52 of the support posts 16 are curved to provide a solid connection with the molded roof 14 of the golf cart 10. The curved portion of the support post 16 defines shoulder area 54 just below the roof 14. As best seen in FIGS. 1 and 2, the upper strap 42 connects to the support posts 16 at the shoulder area 54 such that the shoulder area prevents the upper strap and the side panels 32, 34, 36 connected to the upper strap from slipping down the support posts 16. Accordingly, the cover assembly 12 utilizes the support posts 16 to create a framework that supports the upper strap 42 and the left, right, and rear side panels 32, 34, 36 along the top edge portions 40 to the golf cart 10 immediately adjacent to the molded roof 14 and inside the roof's drip line. The enclosure assembly 12 does not interfere with the molded gutters or handholds formed in the roof 14.

FIG. 3 is a partial plan view of the cover assembly's right side panel 34 and rear side panel 36 shown removed from the golf cart 10 of FIG. 1. The left side panel 32 is substantially identical to the right side panel 34 such that the following discussion regarding the right side panel is equally applicable to the left side panel. As best seen in FIGS. 1–3, the right side panel 34 has the top edge portion 40 that receives the upper strap 42. A bottom edge portion 56 opposite the top edge portion 40 is contoured to extend along side portions of the golf cart's body 18 (FIG. 1). A rear portion 58 of the right side panel 34 extends between the top and bottom edge portions 40 and 56, and the rear portion is securely sewn or otherwise connected to the rear side panel 36 of the enclosure assembly 12. The right side panel 34 also has a contoured leading edge portion 60 extending between the top and bottom edge portions 40 and 56. The leading edge portion 60 is shaped and configured to extend adjacent to and connect to the forward right support post 16 (FIG. 1), as discussed in greater detail below.

The right side panel 34 extends along and fully encloses the right side 24 (FIG. 1) of the golf cart 10. Similarly, the left side panel 32 extends along and fully encloses the left side 22 of the golf cart 10. The right and left side panels 34 and 32 each include a door 62 defined by an elongated zipper 64 that can be opened or closed. When the zipper 64 is fully unzipped and open, the door 62 can be opened to allow a person to move into or out of the golf cart 10 through the right or left side panel 34 or 32. The door 62 of the illustrated embodiment includes an elongated transparent window panel 66 formed in the door's lower portion to provide visibility through the door in the area adjacent to the door. The right and left side panels 34 and 32 also include upper window panels 68 that allow for visibility through the upper half of the side panels. In other embodiments, different window panels or window panel configurations can be used in the enclosure assembly 12 in alternative embodiments.

As best seen in FIGS. 2 and 3, the forward portions of the left and right side panels 32 and 34 are contoured to fit on the front area of the golf cart 10 (FIG. 2). Upper forward corner areas 70 of the left and right side panels 32 and 34 each have a relief portion 72 formed therein. The relief portions 72 are shaped and sized to receive the upper portions 52 of the forward support posts 16 when the side panels are attached to the golf cart 10. Lower forward corner areas 74 of the left and right side panels 32 and 34 each have an enlarged relief area 76 shaped and sized to extend over forward fender areas 78 on the golf cart's body 18 (FIG. 2) without interfering with the wheels or the steering of the golf cart 10.

The left and right side panels 32, 34 are configured to easily connect to the forward support posts 16 on golf carts from different manufacturers. In the illustrated embodiment, the leading edge portion 60 of each side panel 32 and 34 is configured to wrap around the forward support post 16 adjacent to the golf cart's windshield 20, thereby securely anchoring the forward area of the enclosure assembly 12 to the golf cart 10.

As best seen in FIG. 3, a plurality of adjustment strips 80 are sewn onto the leading edge portion 60 in a selected pattern. In the illustrated embodiment, the adjustment strips 80 are elongated lengths of a hook portion or a loop portion of Velcro™ or other hook-and-loop fastener. A mating length 81 (FIG. 2) of the loop portion or the hook portion of the fastener is mounted to each of the forward support posts 16.

As the enclosure assembly 12 is installed on the golf cart 10, and after the upper strap 42 has anchored the top edge portions 40 around the three sides of the golf cart 10, the leading edge portions 60 of the left and right side panels 32 and 34 are wrapped around the forward support posts 16. Then one of the adjustment strips 80 on each side panel's leading edge portion 60 is releasably connected to the mating Velcro™ portion on the respective forward support post 16. The person installing the enclosure assembly 12 can determine which adjustment strip 80 to attach to the forward support post 16 to provide the best fit on the particular golf cart model being enclosed. Accordingly, the leading edge portions 60 of the left and right side panels 32 and 34 can be easily fitted onto a variety of different golf cart models and securely retained in position by selecting the appropriate adjustment strip 80.

In the illustrated embodiment, the leading edge portion 60 of each left and right side panel 32 and 34 has a set of three adjustment strips 80 oriented in selected positions and in a downwardly diverging pattern. In alternate embodiments, greater or fewer adjustment strips 80 can be used and/or arranged in different patterns to provide the versatility to secure the leading edge portions 60 of the left and right side panels 32 and 34 to the forward support posts 16.

Referring to FIGS. 2 and 3, the leading edge portions 60 of the left and right side panels 32 and 34 are also secured to the front end of the golf cart 10 (FIG. 2) by a lower strap 82 that extends across the golf cart's body adjacent to the lower portion of the windshield 20 (FIG. 2). The lower strap 82 releasably attaches to buckles 84 secured to the leading edge portions 60 of the left and right side panels 32 and 34 adjacent to the bottom of the adjustment strips 80. The lower strap 82 and buckles 84 are adjustable to provide fore and aft tension in the left and right side panels 32 and 34 to help reduce shear loads that may be exerted on the adjustment strips 80 during use of the enclosure assembly 12 and the golf cart 10. The lower strap 82 is sized to accommodate different model golf carts having different widths. While the illustrated embodiment uses the lower strap 82 and adjustable buckles 84, other attachment mechanisms can be used to securely retain the leading edge portions 60 of the left and right side panels 32 and 34 to the golf cart 10 (FIG. 2) adjacent to lower portion of the windshield 20.

Each of the left and right side panels 32 and 34 has a pair of bottom buckles 86 and 88 attached adjacent to the bottom edge portion 56. The bottom buckles 86 and 88 of the illustrated embodiment are located just forward and rearward of the door 62. A forward retention strap 90 releasably connects to the forward pair of bottom buckles 86 and extends under the body 18 of the golf cart 10 behind the front wheels. The length of the forward retention strap 90 is adjustable at the bottom buckles 86 to accommodate golf carts having different widths. A similar rear retention strap 92 is releasably connected to the rear pair of bottom buckles 88 and extends under the bottom of the body 18 forward of the rear wheels (FIG. 2). The forward and rear retention straps 90 and 92 are adjustable at the bottom buckles 86 and 88 to securely hold the bottom edge portions 56 of the left and right side panels 32 and 34 adjacent to the left and right sides 22 and 24 of the golf cart 10. Accordingly, the left and right side panels 32 and 34 are held in tension when the forward and rear retention straps 90 and 92 are tightened down.

Lower rear portions 93 of the left and right side panels 32 and 34 are connected to the body 18 of the golf cart 10 (FIG. 2) by an adjustable strap 94 having a hook 96 on one end. The hook 96 is sized to releasably connect to a wheel well 98 of the body 18 of the golf cart 10. The length of the straps 94 are adjustable to help hold the left and right side panels 32 and 34 in tension adjacent to the left and right sides 22 and 24 of the golf cart 10.

Figure 4:
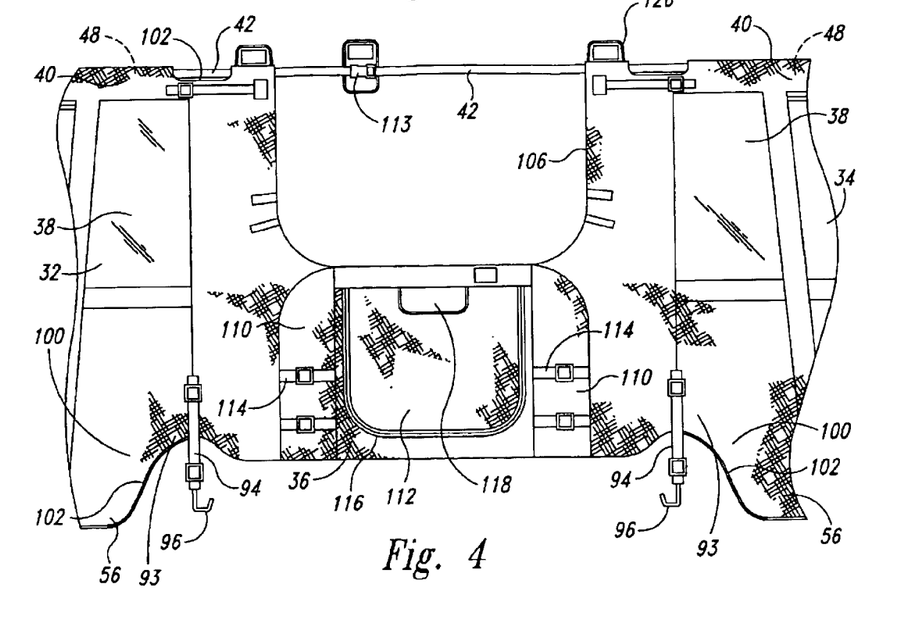
FIG. 4 is an enlarged, partial plan view of the rear panel of the enclosure assembly shown removed from the golf cart of FIG. 1.

As best seen in FIGS. 1 and 4, an upper rear corner area 100 of the enclosure assembly 12 has a rear panel relief cutout 102 positioned to receive the rear support posts 16 of the golf cart 10 (FIG. 1). In the illustrated embodiment, the rear relief cutout 102 is an elongated cutout to accommodate different locations of the rear support posts 16 of different golf cart models when the enclosure assembly 12 is installed. An adjustable compression strap 104 is positioned just below each rear relief cutout 102 and connects at one end to the rear side panel 36 and at the other end to the left or right side panel 32 or 34. The compression straps 104 can be tightened to help put lateral tension in the left, right, and rear side panels 32, 34 and 36. This lateral tension helps keep the upper portions of the left, right, and rear side panels 32, 34, and 36 substantially flat.

The rear side panel 36 is shaped and sized to smoothly extend around the rear end portion 26 of the golf cart 10 when golf bags and golf clubs 30 (FIG. 1) are contained in the storage area 28 (FIG. 1). As best seen in FIGS. 1 and 4, the rear side panel 36 has an enlarged cutout 106 in the upper half that provides access through the rear side panel to the golf bags/golf clubs 30 or other items in the storage area 28. A removable rear window assembly 108 is connected to the rear side panel 36 and positioned to cover the enlarged cutout 106. The rear window assembly 108 is made of a durable transparent material, such as a flexible, heavy plastic, to provide visibility for the cart driver out the rear end portion 26 of the golf cart 10.

The rear window assembly 108 of the illustrated embodiment is a removable window panel that releasably attaches to the top edge portion 40 of the rear side panel 36. The rear window assembly 108 of the illustrated embodiment includes a window batten 122 (FIGS. 1 and 7) that extends through a sleeve 124 (FIGS. 1 and 7) formed in the top edge 40 of the window assembly 108. The sleeve 124 and the batten 122 are releasably attached via hook-and-loop fasteners on flaps 126 (FIGS. 4 and 6) at the top of the rear side panel 36. The window batten 122 keeps the rear window assembly 108 from puckering along the top edge 40 to maintain good visibility through the rear window assembly 108. In one embodiment, the lower edge of the rear window assembly 108 has a window batten to help keep the lower portion of the rear window assembly flat or another selected shape. The lower edge of the rear window assembly 108 can be securely and releasably held in a lowered position by a pair of fasteners 128 (FIG. 7), such as fastener sections attached to the inside surface of the window and mating fastener sections 130 (FIG. 8) attached to the rear side panel 36 just above an access panel 112. Accordingly, the rear window assembly 108 can be held in a closed position to prevent gapping and avoid flapping in the wind or as a result of bumpy terrain over which the golf cart 10 may be driven.

The rear side panel 36 has a plurality of adjustment straps to assist in maintaining a snug fit and a desired shape of the rear side panel relative to the golf cart 10. Maintaining the shape of the rear side panel 36 helps maintain the desired shape of the enlarged cutout 106 for visibility through the rear side panel. The shape of the rear side panel 36 also helps the rear window assembly 108 maintain proper shape when it is draped over the enlarged cutout 106.

Figure 6:
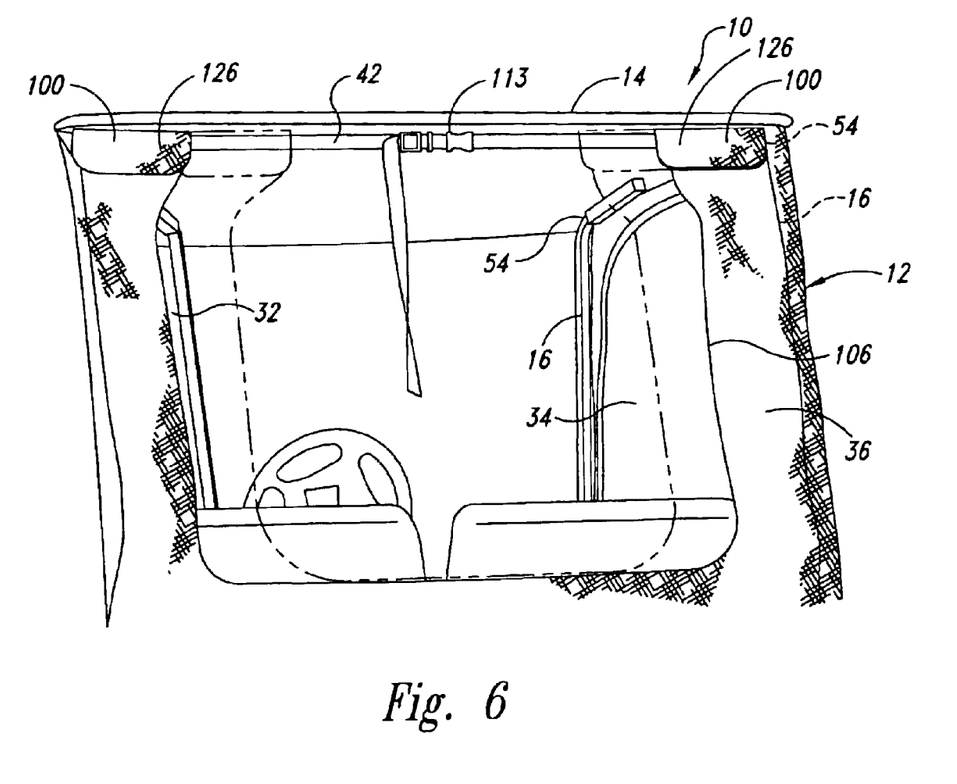
FIG. 6 is an enlarged, rear elevation view of the golf cart and enclosure assembly of FIG. 1 with a rear panel shown in solid lines in a first configuration on a wide golf cart, and shown in phantom lines in another configuration when installed on a narrower or shorter golf cart.

FIG. 6 is an enlarged partial rear elevation view of the rear side panel 36 with the window assembly 108 removed. The upper strap 42 extends through the rear corner areas 100 and spans across the top of the enlarged cutout 106 in the rear side panel 36. The upper strap 42 includes an intermediate adjustment device 113, such as a side-relief buckle, that allows the upper strap 42 to be tightened or loosened around the support posts 16. Accordingly, the upper strap 42 can be adjusted at the intermediate adjustment device 113 to cinch the upper strap around the shoulder areas 54 of the support posts 16 to keep the upper strap 42 and side panels 32, 34, and 36 from slipping down over the support posts.

When the enclosure assembly 12 is installed on a model of a golf cart 10 from one manufacturer that is fairly wide, as shown in solid lines in FIG. 6, the rear side panel 36 remains spread wide apart, forming a large rear window area. When the same enclosure assembly 12 is installed on a different golf cart 10, such as smaller or narrower golf cart, the upper strap 42 can be tightened at the adjustment device 113 to accommodate the different-sized golf cart. When the upper strap 42 is tightened, the portions of the rear side panel 36 around the enlarged cutout 106 are drawn closer together, as shown in phantom lines, thereby resulting in a smaller rear window area while still providing sufficient visibility for the driver out the rear of the golf cart 10.

As best seen in FIGS. 1 and 4, the rear side panel 36 of the illustrated embodiment includes a pair of integral adjustment panels 110 on opposite sides of the access panel 112 below the enlarged cutout 106. The adjustment panels 110 each include a pair of adjustable compression straps 114 that allow the effective width of the rear side panel 36 to be adjusted to accommodate golf carts/golf bags 30 (FIG. 1) of different sizes. As best seen in FIG. 1, the rear compression straps 114 can be cinched up so as to cause an intentional fold to occur in the adjustment panels 110 and to snugly secure the rear side panel 36 of the enclosure assembly 12 over the rear portion 26 of the golf cart 10. Although the illustrated embodiment shows a pair of compression straps 114 secured to the rear side panel 36 adjacent to each of the adjustment panels 110, other adjustment mechanisms can be used in other embodiments to adjust the effective width of the rear side panel 36.

Figure 7:
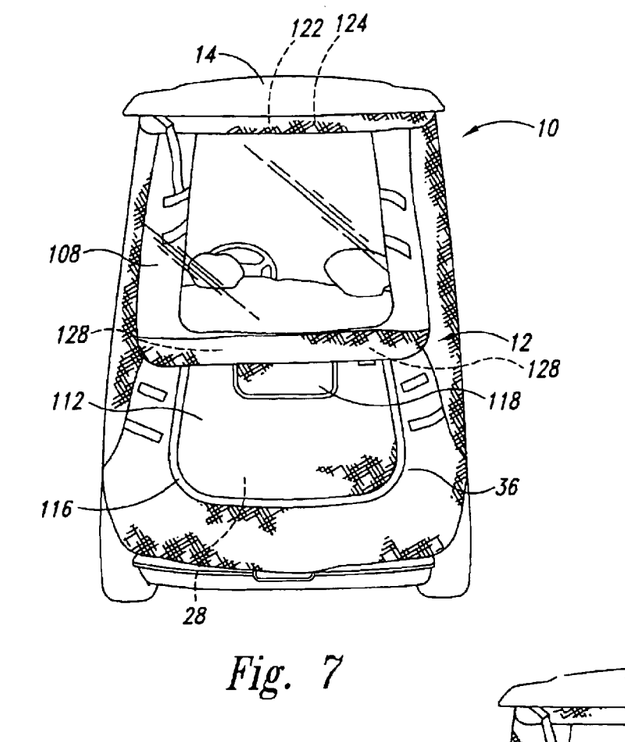
FIG. 7 is an enlarged rear elevation view of the golf cart and enclosure assembly of FIG. 1 with a window in a lowered position and an access panel in a closed position.
Figure 8:
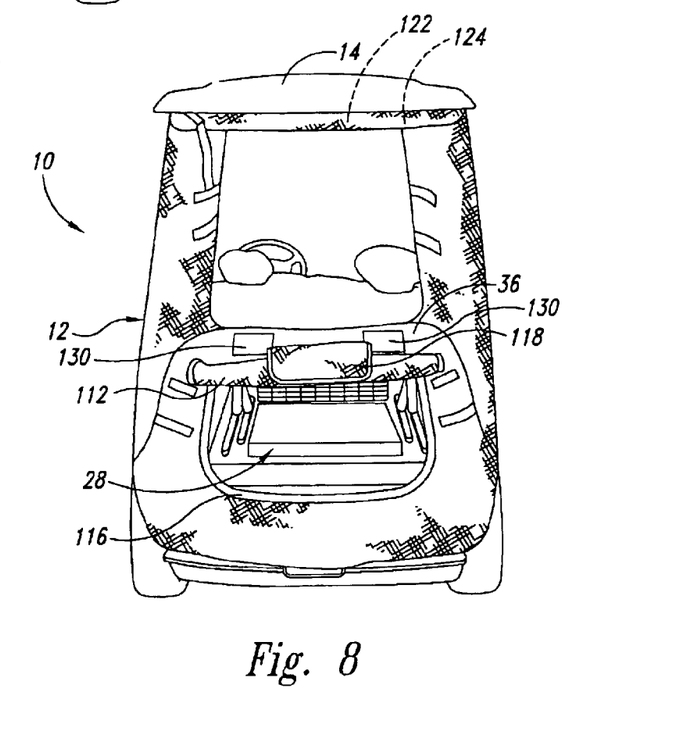
FIG. 8 is an enlarged rear elevation view of the golf cart and enclosure assembly of FIG. 1 with the rear window removed and the access panel open.

FIG. 7 is an enlarged rear elevation view of the golf cart 10 and enclosure assembly 12 of FIG. 1 with the rear window assembly 108 in a lowered position and the rear access panel 112 in a closed position. FIG. 8 is an enlarged rear elevation view of the golf cart 10 and enclosure assembly 12 of FIG. 1 with the rear window assembly 108 removed and the access panel 112 in an open position. The access panel 112 of the illustrated embodiment has an elongated zipper 116 arranged in a U-shape: When the zipper 116 is zipped closed, the access panel 112 is securely closed and covers the lower portion storage area 28 of the golf cart 10. When the zipper 116 is unzipped, the access panel 112 can be opened and rolled up to allow access into the storage area 28.

A retention flap 118 on the rear side panel 36 is positioned to engage the rolled-up access panel 112 and hold the access panel open. In the illustrated embodiment, sections of Velcro™ or another hook-and-loop fastener are provided on the inside surface of the access panel 112 and on the retention flap 118. When the access panel 112 is rolled up, the Velcro™ sections can be attached to each other to securely retain the access panel 112 in the open position, and they can be quickly and easily released to lower the access panel.

Figure 9:
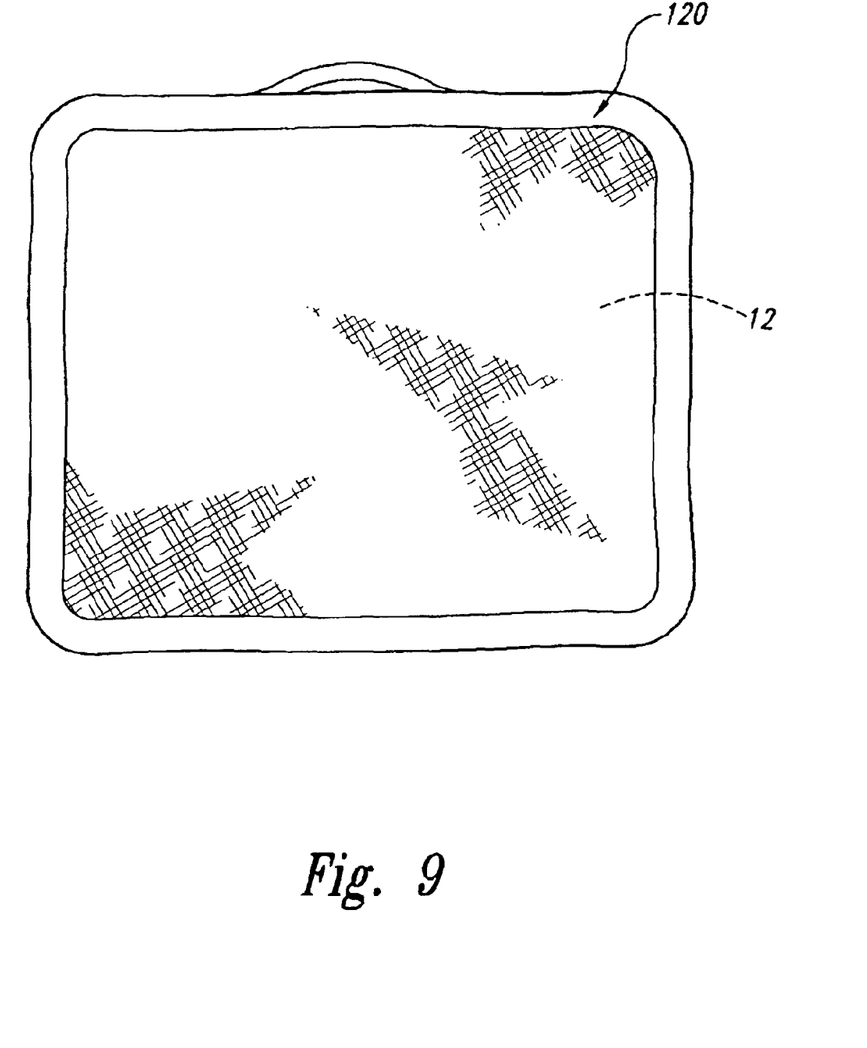
FIG. 9 is a side elevation view of a carrying bag for the enclosure assembly of FIG. 1.

FIG. 9 is a front elevation view of a carrying bag 120 for the enclosure assembly 12 when removed from the golf cart 10 (FIG. 1). In the illustrated embodiment, the carrying bag 120 is a generally rectangular soft-sided bag having an opening along the top edge and sized to fully contain the enclosure assembly 12 when removed from the golf cart 10 (FIG. 1) for easy and convenient storage or handling. In alternate embodiments, hard-sided bags or carrying cases can be used for storage of the enclosure assembly 12.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. An enclosure assembly usable with a golf cart having at least two upright members supporting a roof portion, comprising:

first and second side panels positionable adjacent to side portions of the golf cart, the first and second side panels having edge portions positionable adjacent to the roof portion;

a rear panel between the first and second side panels and being positionable adjacent to a rear portion of the golf cart; and a strap portion connected to the top portions of the first and second side panels and being configured to removably attach the first and second side portions to the two upright members of the golf cart adjacent to the roof portion with the first and second side panels supported adjacent to side portions of the golf cart and the rear panel positioned adjacent to a rear portion of the golf cart.

2. The enclosure assembly of claim 1 wherein at least one of the side panels has a forward edge portion and a connection member connected to the forward edge portion, the connection member being releasably connectable to one of the two upright members.

3. The enclosure assembly of claim 1 wherein at least one of the side panels has a forward edge portion and a plurality of connection members connected to the forward edge portion at selected positions to fit selected ones of different golf carts.

4. The enclosure assembly of claim 1 wherein the strap has an adjustable length to fit one of a plurality of different golf carts.

5. The enclosure assembly of claim 1 wherein the rear panel has at least one adjustment member adjustable to change an effective width of the rear panel relative to the rear portion of the golf cart.

6. The enclosure assembly of claim 1, further comprising a second strap connectable to forward portions of the first and second side panels and being positionable across a front portion of the golf cart positioned generally between the side portions.

7. The enclosure assembly of claim 1 wherein at least one of the first and second side panels have a relief cutout shaped and sized to receive a portion of the upright member therein.

8. The enclosure assembly of claim 1 wherein at least one of the first and second side panels include an adjustable relief portion adjacent to the top portion of the at least one of the first and second side panels and sized to receive an upright member of the golf cart therein.

9. The enclosure assembly of claim 1, further comprising bottom connection members coupled to the first and second side panels and connectable to the golf cart to retain the bottom portions of the first and second side panels adjacent to the golf cart.

10. The enclosure assembly of claim 1, further comprising a carrying case that contains the rear panel and the first and second panels when removed from the golf cart.

11. A golf cart assembly, comprising:

a golf cart having a body and at least two upright members supporting a roof portion over the body, the golf cart having first and second side portions extending between front and rear portions;

a first flexible side panel removably adjacent to the first side portion of the golf cart, the first side panels having a first edge portion adjacent to and under the roof portion;

a second flexible side panel removably adjacent to the second side portion of the golf cart, the second side panels having a second edge portion adjacent to and under the roof portion;

a rear panel between the first and second side panels and adjacent to the rear portion of the golf cart; and a strap portion connected to the first and second edge portions of the first and second side panels and releasably attached to the two upright members of the golf cart adjacent to the roof portion with the first and second side panels supported adjacent to first and second side portions of the golf cart, respectively, and the rear panel adjacent to a rear portion of the golf cart.

12. The assembly of claim 11 wherein at least one of the first and second side panels has a forward edge portion and a connection member connected to the forward edge portion, the connection member being releasably connected to one of the two upright members.

13. The assembly of claim 11 wherein at least one of the first and second side panels has a forward edge portion and a plurality of connection members connected to the forward edge portion at selected positions to adjust the fit of the at least one of the first and second side panels relative to at least one of the two uprights.

14. The assembly of claim 11 wherein the strap has an adjustable length to fit on one of a plurality of different golf carts.

15. The assembly of claim 11 wherein the rear panel has at least one adjustment member adjustable to change an effective width of the rear panel relative to the rear portion of the golf cart.

16. The assembly of claim 11, further comprising a second strap connectable to forward portions of the first and second side panels and being positionable across the front portion of the golf cart.

17. The assembly of claim 11 wherein at least one of the first and second side panels has a relief cutout shaped and sized to receive a portion of one of the upright members therein.

18. The assembly of claim 11 wherein at least one of the first and second side panels includes an adjustable relief portion adjacent to the top portion of the at least one of the first and second side panels and sized to receive one of the upright members of the golf cart therein.

19. The assembly of claim 11, further includes bottom connection members coupled to the first and second side panels and releasably connected to the body of the golf cart to retain the bottom portions of the first and second side panels adjacent to the body.

20. The assembly of claim 11, further comprising a carrying case that contains the rear panel and the first and second panels when removed from the golf cart.

* * * * *